Oct. 4, 1960 — B. S. GOSSLING — 2,955,076
ARTIFICIAL MUTATION OF MICRO-ORGANISMS BY ELECTRICAL SHOCK
Filed Oct. 4, 1956
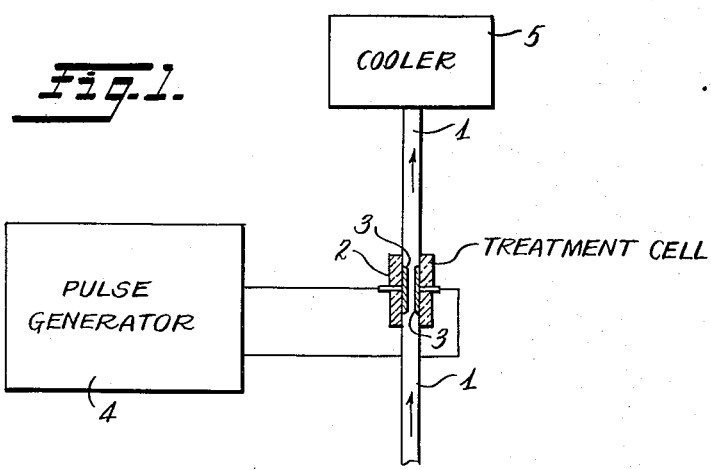
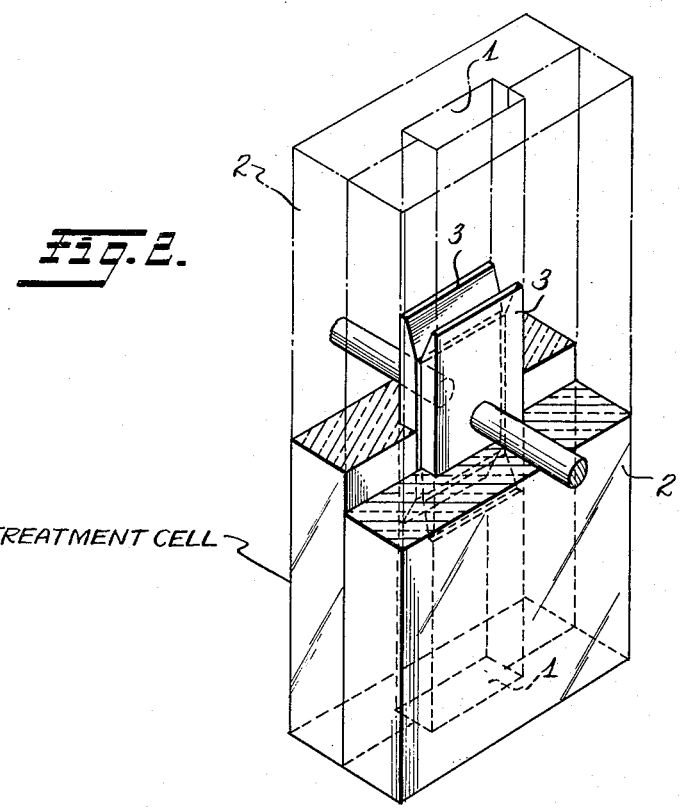
INVENTOR.
Brian Stephen Gossling
BY Bacon & Thomas
ATTORNEYS United States Patent Office 2,955,076
Patented Oct. 4, 1960

2,955,076
ARTIFICIAL MUTATION OF MICRO-ORGANISMS BY ELECTRICAL SHOCK

Brian Stephen Gossling, Wembley, England, assignor to The General Electric Company Limited, London, England, a British company Filed Oct. 4, 1956, Ser. No. 614,030

Claims priority, application Great Britain Oct. 5, 1955

8 Claims. (Cl. 195—78)

This invention is concerned with the treatment of micro-organisms. More specifically it relates to the electrical shock treatment of micro-organisms for the purpose of bringing about an alteration in their properties.

The use of micro-organisms of the most varied kinds is today widespread in industry, those organisms being employed to bring about various and sometimes complex transformations. Well known examples of the use of micro-organisms in this way are for instance to be found in cheese-making, antibiotic-production, brewing and baking and synthetic chemical fields. The value of such organisms for their specific industrial application is however almost always dependent on some particular property or properties which they possess, and accordingly continuous efforts are made either to improve their performance in respect of desired attributes or to reduce or eliminate any accompanying and undesirable properties. These efforts have in the past been largely concerned with the selection from both cultivated and wild sources of those strains of the micro-organisms which showed the desired properties to the greatest extent. More recently however mutations have been artificially induced in organisms by various means, and the mutated organisms have been tested and those ones selected which demonstrated any improvement in properties as compared with the unmutated parent stock.

The techniques which have so far been applied in an effort to bring about artificial mutation of organisms include the use of chemical mutagenic agents, such as mustard gas, and of high-energy radiations such as ultra-violet light and X-rays. Such mutagenic agents are believed to act by virtue of an attack on certain functions within the organism which is under treatment, and it would appear that at least in part the type of mutation that can be brought about by the use of one technique cannot be brought about by another, and vice versa. The discovery of a new mutagenic technique therefore opens the way to further advances in the artificially induced mutation of organisms and their subsequent testing and selection for desired properties, with concomitant industrial advantages.

The present invention will be described in detail hereinafter in conjunction with the accompanying drawing in which:

Fig. 1 is a diagrammatic view illustrating the process of the present invention and apparatus used therein; and Fig. 2 is a schematic perspective view, partly in section, showing the treatment cell in greater detail.

I have now found that heritable changes in the nature of mutation can be artificially induced in micro-organisms of many different kinds, particularly unicellular organisms, by the application to them in a liquid medium of a severe electrical shock treatment. Such treatments have been found to be highly effective in bringing about variations in the properties of various organisms, are simply and convenient to carry out, and moreover possess the added advantages that the severity of the treatment applied to the organism is capable of ready control; furthermore the effectiveness of the treatment is not much affected by the composition of the medium in which the micro-organisms are suspended.

According to the invention therefore there is provided a process for artificially inducing heritable variations in the properties of micro-organisms which comprises subjecting the organisms in a suitable liquid medium to a severe electrical shock treatment.

The terms "heritable variation" or "mutation" are used in the present specification to refer to change imparted to an organism which is heritable for at least several generations. They do not necessarily imply that the change is permanently heritable for all generations or that any particular mechanism, e.g. change in chromosome material, is involved.

The severity of the shock treatment is inter alia a function of two factors, namely the intensity of the shock and the total energy dissipated in the treatment. The intensity of the shock depends on the rate of energy dissipation in the medium, and while the lower effective limit varies according to the organisms under treatment it can in general be said that the requisite intensity of electrical shock is delivered to the organisms if the rate of energy dissipation in the medium while under treatment exceeds a lower limit of approximately 100 kilowatts per cubic centimetre. With many organisms it is preferable much to exceed this lower limit, and I have, for example, found that a rate of energy dissipation of the order of 1,000 kilowatts per cubic centimetre is very satisfactory for many micro-organisms.

The liquid medium employed in the process of this invention must of course be compatible with the micro-organisms being treated; it must also be capable of transmitting the electrical energy necessary to impart the severe shock and thus desirably have reasonable conductivity. Many nutrient or semi-nutrient media suitable for micro-organisms may thus be used although it is not essential that the media employed have any nutrient properties.

The effectiveness of the mutation technique of the present invention can be demonstrated on a wide range of micro-organisms including not only those which are known to have specific industrial applications but also others, so that it can be stated to be of general application. The technique can be successfully applied to a very wide range of unicellular micro-organisms including aerobic, anaerobic, faculative and micro-aerophilic bacteria, and yeasts and moulds generally. While "mutation" is a term which may or may not be strictly applicable to viruses, it can at least be said that application of this mutation technique results in their inactivation by a factor as great as $10^8$.

The duration of the shock treatment in the sense of the time between its commencement and completion is not critical; it will however be clear that the total energy dissipated in the medium will be a function of the intensity of the shock and the time during which it is delivered. The total time during which a shock of any given and adequate intensity must be delivered if a shock of the requisite severity is to be administered should therefore be such as to ensure that the total energy dissipated in the medium exceeds a lower limit of approximately 10 calories, that is to say 42 joules, per cubic centimetre. Here again I have for many organisms found it preferable considerably to exceed this lower limit, and I have found that a range of from 20 to 60 calories, or 84 to 250 joules, per cubic centimetre is frequently desirable.

It is not essential that the requisite total energy should all be dissipated in the medium by a single uninterrupted shock. It is on the contrary an important feature of the invention that a shock of the required severity shall be administered to the micro-organisms as the sum of a series of shocks each of the requisite intensity but of lesser severity. Such an effect can readily be brought about by the use of pulsed currents.

When using pulsed electric currents the severity of the treatment depends of course inter alia on the intensity of each pulse, its duration and the number of pulses administered to each volume of medium. The intensity of each pulse must be chosen in the manner previously explained. The duration of each pulse is not apparently highly critical, and can for example be as great as or even greater than 50 microseconds, and as little as or even less than 5 microseconds. It is however a preferred feature of the invention that the pulse duration should lie between these limits, and we have for example found that a pulse duration of about 10 microseconds is very satisfactory for most micro-organisms.

The interval between pulses also is not critical, provided of course that it is not so long as to permit the organism to recover from the effect of the preceding pulse. However, because the contribution of each pulse to the total input of energy is normally so considerable only a few pulses can usually be given in direct succession, and since the overall time of application cannot as a rule be conveniently less than a few hundredths of a second, the interval between pulses is necessarily much longer than that of the pulses themselves. Intervals of $\frac{1}{500}$ and $\frac{1}{100}$ second have been found equally suitable with many organisms. The number of pulses of any given intensity and duration which must be delivered to the organism will be determined by the total energy which it is intended to dissipate in the medium.

Although the severity of the shock administered to the organism under treatment is a function inter alia of the total energy dissipated in the medium it is believed that the effect on the organism is almost wholly electrical and not thermal in nature. It is in fact preferred that steps should be taken to minimise any thermal changes which may accompany the electrical treatment. Thus the medium may advantageously be cooled both during and after the treatment in any convenient manner. Moreover, bearing in mind that the severity of the shock is a function of the total energy dissipation only while a shock of adequate intensity is passing, whereas any accompanying thermal changes reflect energy dissipated also by pulses or parts of pulses which are of less than the requisite intensity, it will be appreciated that the use of pulses of the so-called "square" type is generally to be preferred to the use of, for example, sine-shaped pulses, unless the power maximum is far in excess of the threshold, in which case the form of the pulse is less important.

It has been found that the temperature of the medium, in which the micro-organisms are suspended, in many cases significantly affects the efficiency of the treatment. The optimum temperature for treatment of any particular organisms can best be determined by simple preliminary test. While for a wide range of micro-organisms satisfactory results will be obtained at or around room temperature, it can in general be said that, within limits, the lower the temperature the greater the efficiency of the treatment is likely to be. Thus for example certain organisms which were thought to be unresponsive to the treatment after testing at room temperature, e.g. 18° C., have since been found to be considerably more and even fully responsive at lower temperatures, for example 3° C.

It must always be remembered that any particular micro-organism which is to be subjected to the mutation technique of the present invention may require other special conditions peculiar to it to be observed before the treatment can become effective. Such special conditions if required may be of very many different kinds, including for example adjustments of temperature, pH, concentration etc. By way of illustration the response of $E.$ $coli$ to treatment, like that of many other cytochrome-bearing organisms, has been found to depend at least to some extent on the amount of air or oxygen dissolved in the suspending medium being neither too great nor too small, so that in the case of such organisms a necessary further condition for their effective treatment is that exposure to air between the stages of the treatment shall be limited but not entirely eliminated.

In order to assess whether or not any particular treatment was effective in bringing about tmutation of the micro-organisms to which it applied I have found it convenient to employ as a yard-stick the percentage of the organisms which are killed or rendered non-viable by the treatment. I have in general found that a satisfactory electrical shock treatment for the purpose of this invention is one in which at least 10% and less than 100% of the micro-organisms are killed or rendered non-viable. Usually the shock should be such as to render not less than 20% and preferably at least 50% non-viable. Optimum results have in general been obtained by treatments in which from 90% to 95% are killed or rendered non-viable. By applying these critera to the treated organism it is possible to determine whether an electrical shock of the requisite severity has been administered, and if not to adjust any or all of the relevant factors, including the temperature of the treatment, so as to improve the result.

When the micro-organisms have been subjected to the treatment it is usually though not always necessary to isolate and test each of the organisms which remain viable in order to determine whether or not it has suffered any mutagenic change, and, should it have done so, further to determine whether the change it has undergone is an advantageous one for what industrial function it is to perform. The particular techniques for isolation and testing will of course vary somewhat according to the nature of the organism. In general terms, however, one convenient procedure is to dilute the medium and plate out the suspension of organisms in such a way as to ensure that each viable organism will give rise to a separate and distinct colony. It is usually convenient at this stage to carry out a primary screening of these colonies, by applying some simple test appropriate to the organism and the property by reason of which it is of value, and thus to reject all those colonies which show no promise of improvement over the parent untreated strain of the organism. Colonies which show promise of improvement are then selected and usually further cultured under conditions which more nearly approximate to those under which the industrial process operates, and a detailed and quantitative comparison of more of the new mutant strains with their parent strain. Finally of course those mutant strains produced by the treatment which on balance of all their properties show the greatest improvement over the parent strain are substituted for the latter and employed in the industrial process. In their industrial application the new strains will in general be found to behave in much the same manner as the parent strain, save in respect of the property or properties for which they have been selected. Naturally however minor differences in their cultural characteristics are likely to exist, and optimum results may only be attained as a result of further trial.

Many varied methods exist of applying the electrical shock treatment to the medium, of which the simplest is perhaps merely to place the micro-organisms suspended in the medium into a cell having two electrodes to which the electrical supply is connected for so long as may be required to pass the desired number of pulses. Preferably however the medium bearing the micro-organisms will be made to flow as shown in Fig. 1 via conduit 1 through a treatment cell 2 between the electrodes 3 connected to a pulse generator 4, its rate of flow and if need be the frequency of the electric pulses being so chosen that a shock of adequate severity will be delivered to each portion of the medium during the time it flows into, across and out of the treatment zone.

It will be clear to those skilled in the art, once the nature of the electrical treatment described above has been appreciated, that many varied types of electrical equipment may be used to generate shocks of a suitable type and severity. I shall however now briefly describe referring to Fig. 2 for details of the treatment cell, one form of apparatus which I have found generally satisfactory.

A simple arrangement for the electrical shock treatment of micro-organisms on a laboratory scale comprises a treatment cell 1 of glass or other chemically inert insulating material through which the liquid medium flows in such a way that the whole of it passes between plane electrodes 3 of the order of 1 square cm. in area and spaced apart by a distance of the order of 1 mm. Other forms of cell may be used, and in particular a form in which, in order to minimize attack on the electrodes, larger electrodes are separated by an insulating partition of a thickness of the same order as the above separation and which is perforated with a number of holes, the total cross-sectional area of which is of the same order as the above electrode area, thus ensuring that the power density is of the requisite order in the holes.

The liquid before and/or after passing through the cell, and, if necessary, the cell itself, may be cooled in any suitable manner as by a cooler 5 shown in Fig. 1.

To achieve the necessary operating power densities, which are preferably of the order of 1000 kw. per cc., it has been found that electric pulse generating arrangements are suitable. Thus, for example a suitable static generator comprises a multiple T network of series inductances (having graded saturable cores) and shunt capacities supplied from a condenser suitably energized from the normal A.C. mains supply and terminating in the load represented by the treatment cell. One suitable static pulse generator has for example been described by W. S. Melville (Proc. Inst. Electrical Engineers, vol. 98, part III, p. 185, 1951).

For example, using a simpler form of the generator described by Melville, having two sections, the input can be of the order of 250 volt 50 cycle and the output of the order of a few kilovolts in pulse form. Using such a generator the duration of each pulse is rather less than 10 microseconds.

In order that the invention may be well understood I now give the results of experiments which I have conducted on the mutation of lactic streptococci; these organisms are used in the cheese industry and are there called "cheese starters." As is known, these organisms often suffer from infection by viruses, known as bacteriophages, which are capable of bringing about almost complete inactivation and lysis of the lactic streptococci. Thus bacteriophage attack is a serious problem in the cheese industry. By the use of the mutation procedure of this invention I have been able to achieve mutations in lactic streptococci and have found that the mutated organisms show increased resistance to bacteriophage infection:

EXPERIMENT I

The cheese starter used was a strain of *Streptococcus lactis* designated $M_2S_1$. The proportion of this starter surviving infection with its associated bacteriophage $m_2s_1$ was very low, only 1 in 5000. An 18-hour culture of this starter in yeast-dextrose broth was used to produce a 2% inoculum in 4 litres of yeast-dextrose broth, the population of the resulting suspension being about 30 million organisms per cc. This suspension was made to flow between plane platinum electrodes of area 2.1 $cm.^2$ and .051 cm. a part at such a rate that each element of the suspension took 1/50 second to pass between the electrodes and during its passage experienced two pulses one in each direction.

The effective duration of each pulse, that is the time during which the power dissipation exceeded one half of its maximum value, was 10 microseconds, and the maximum dissipation was about 1200 kilowatts per cc.

During one passage between the electrodes, the temperature of the suspension rose 6° C. so that the input of energy was 6 calories per cc. Immediately after passage between the electrodes the suspension was cooled to its original temperature of 20° C. Samples of the suspension were taken after each of seven successive passages, and also an untreated control sample taken before the first passage.

Uninfected and infected portions of each sample were compared by nephelometric observation of changes in the population of intact cells at intervals during several hours' incubation at 30° C. The infection given was the usual test infection, namely 1% of a fully lysed culture of the host starter.

The population of the untreated infected control fell during 4 hours' incubation, showing that the bacteriophage was active in lysing the organisms. The samples taken after the third and later passages showed the same increase of population whether infected or uninfected, demonstrating that after the third stage of the treatment the lysis has been suppressed. Furthermore this increase of population was maintained through six generations, showing that the resistance to lysis was heritable.

Other portions of both uninfected and infected samples were recultured overnight in sterilized milk at 22° C. and the acid produced by them in a 1% inoculum in sterilized milk incubated for 6 hours at 30° C. was estimated by titration.

The results of the titrations in percentage lactic acid are set out in the following table:

*Table I*

| Sample | Control | 2nd stage | 3rd stage | 5th stage | 6th stage | 7th stage |
|---|---|---|---|---|---|---|
| Uninfected | .51 | .38 | .37 | .35 | .35 | .34 |
| Infected | .24 | .32 | .36 | .35 | .35 | .34 |

Thus, although the acid production of the treated samples was considerably diminished, their response to infection was almost negligible after the 3rd stage of the treatment, and after the 5th stage there was no response at all to infection.

The heritable resistance to infection demonstrated nephelometrically on the day of treatment was thus shown to be maintained during the overnight reculture when measured in terms of the practically important property of acid production.

EXPERIMENT II

The same strain of starter as was used in Experiment I was similarly treated in 2% suspension in milk, using a different pulse generator and different treatment electrodes. The pulses were of 2 microsecond duration and of quasi-rectangular shape. The electrodes were of platinum gauze of area 1 $cm.^2$ at 0.3 cm. separation. The time of passage was again 1/50 sec., and since the interval between pulses was now 1/500 sec. there were 10 pulses per passage, each with a maximum dissipation of 2000 kilowatts per cc.

The rise of temperatue per passage was 9.5° C.

The proportions found by plate count to be non-viable after the successive stages were, 1st stage, 25%; 2nd stage, 49%; 4th, 93%; 5th, 95%; 6th, 98.7%. Infected plates showed complete suppression of lysis after the 4th and subsequent stages.

The results of titrations after an overnight reculture are set out in the following table:

*Table II*

| Sample | Control | 1st stage | 2nd stage | 4th stage | 5th stage | 6th stage |
|---|---|---|---|---|---|---|
| Uninfected | .43 | .36 | .35 | .36 | .34 | .34 |
| Infected | .21 | .23 | .25 | .35 | .34 | .34 |

This treatment, in milk instead of broth, and under very different electrical conditions, was thus comparably effective in making the acid production independent of infection.

Furthermore, after three further recultures the titration figures were almost unchanged.

That the result of the treatment according to the present invention is to produce a mutation and not merely to select from a non-homogeneous population those members which are naturally resistant to the virus can for instance be seen from Experiments I and II above. Here the starter was a very pure strain, and the proportion capable of surviving infection was very low, being under 1 in 1,000.

After the treatment the still-viable survivors, which have now become resistant to infection, were of the order of 10% i.e. 1 in 10, of the original population. Thus, they greatly exceeded in number the original naturally-resistant organisms, even if none of these latter had been made non-viable by the treatment. It is noteworthy that, after treatment, infection makes no difference to viability, which indicates that all the viable survivors have mutated.

EXPERIMENT III

The 2 microsecond pulses described in Experiment II were used for treating a suspension in yeast-dextrose broth with results closely similar to those previously described in Experiments I and II.

EXPERIMENT IV.—PERSISTENCE OF RESISTANCE TO BACTERIOPHAGE ATTACK AFTER TREATMENT WITH PULSED ELECTRIC CURRENTS

A cheese starter, which had been given a treatment by pulsed electric currents similar to that described in Experiment II above, was tested after 35 reculturings and again after 69 reculturings and found on both occasions to show no response to infection. It should be noted that a single reculture is equivalent to very many generations of the cheese starter organism.

EXPERIMENT V.—PERSISTENCE OF RESISTANCE AFTER COMBINED THERMAL AND ELECTRICAL TRATMENTS

A portion of the starter referred to in Experiment IV, after it had been recultured 42 times, and showed no response to infection, was given a second treatment with pulsed electric currents, and after 26 further reculturings still showed no response to infection.

The above experiments upon lactic Streptococci have been here described, since they are the most striking results which I have so far obtained by the use of the process and apparatus according to the invention. It is to be understood however, that many other microorganisms of varied kinds may be mutated by the process of the invention.

I claim:

1. A process for artificially inducing heritable variations in the properties of micro-organisms which comprises subjecting the organisms in a liquid conductive medium to a severe electrical shock treatment by applying a voltage between electrodes in contact with the medium so as to produce an electric current in the medium and thereby to dissipate electrical energy in it at a rate exceeding 100 kilowatts per cubic centimetre for a time sufficient for the total energy dissipation to exceed 10 calories per cubic centimetre and so that a fraction exceeding 10% of the organisms is killed.

2. A process as claimed in claim 1 wherein the shock treatment comprises a series of repeated shocks imparted by means of high voltage pulsed currents.

3. A process as claimed in claim 2 in which the duration of each pulse is between 5 and 50 microseconds.

4. A process as claimed in claim 3 in which the interval between successive pulses is between $\frac{1}{500}$ and $\frac{1}{100}$ second.

5. A process as claimed in claim 2 in which the pulses are of square wave form.

6. A process as claimed in claim 2 in which the severity of the shock treatment is such that at least 50% of the organisms are killed thereby.

7. A process as claimed in claim 2 in which the severity of the shock treatment is such that from 90–95% of the organisms are killed thereby.

8. A process as claimed in claim 2 in which the treated organisms are diluted and cultured such that each individual organism gives rise to a separate colony and separating such of the colonies as exhibit desirable characteristics imparted by the shock treatment.

References Cited in the file of this patent

UNITED STATES PATENTS

| | | |
|---|---|---|
| 2,107,830 | Liebesny et al. | Feb. 8, 1938 |
| 2,122,741 | Haddad | July 5, 1938 |
| 2,133,203 | Liebesny et al. | Oct. 11, 1938 |
| 2,196,361 | Liebesny et al. | Apr. 9, 1940 |
| 2,301,315 | Opp | Nov. 10, 1942 |
| 2,445,748 | Demerec | July 27, 1948 |
| 2,456,909 | Brasch | Dec. 21, 1948 |
| 2,540,223 | Tolman | Feb. 6, 1951 |
| 2,571,115 | Davis | Oct. 16, 1951 |
| 2,578,673 | Cushman | Dec. 18, 1951 |

OTHER REFERENCES

Journal of Infect. Diseases (Fabian et al.), vol. 53, 1933, pp. 76–88 relied on.

Journal of Hygiene (Lea et al.), vol. 41, No. 1, January 1941, pp. 1–16 relied on.

Electrical Engineer (Fleming), January 1944, pp. 18–21 relied on.

American Brewer (Lion et al.), January 1949, pp. 21 to 24 relied on.